Figure 1:
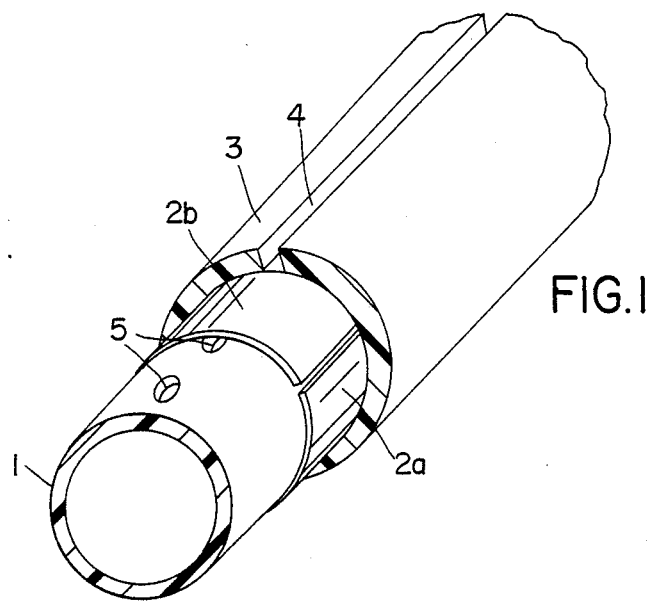

United States Patent [19]

Pramsoler

[11] Patent Number: 4,948,295
[45] Date of Patent: Aug. 14, 1990

[54] PIPE FOR WATERING PLANTS

[76] Inventor: Arnold Pramsoler, Feldweg 6, A-6111 Volders, Austria

[21] Appl. No.: 277,456

[22] PCT Filed: May 13, 1986

[86] PCT No.: PCT/AT86/00042
§ 371 Date: Jan. 13, 1987
§ 102(e) Date: Jan. 13, 1987

[87] PCT Pub. No.: WO86/06578
PCT Pub. Date: Nov. 20, 1986

Related U.S. Application Data

[63] Continuation of Ser. No. 15,857, Jan. 13, 1987, abandoned.

[51] Int. Cl.⁵ .................... A01G 25/06; E02B 13/00
[52] U.S. Cl. ........................... 405/44; 405/43; 405/47; 405/36; 239/542; 239/568; 239/566; 239/590.3
[58] Field of Search .............. 405/36, 43, 44, 45, 405/47, 48, 49, 50; 239/145, 542, 553.3, 566, 568, 590.3, 597

[56] References Cited

U.S. PATENT DOCUMENTS

| | | | |
|---|---|---|---|
| 2,798,768 | 7/1957 | Babin | 239/145 |
| 3,403,519 | 10/1968 | Balko | 405/45 X |
| 3,601,320 | 8/1971 | DuPlessis | 239/553.3 |
| 3,698,195 | 10/1972 | Chapin | 239/145 |
| 3,777,987 | 12/1973 | Allport | 239/542 |
| 3,874,598 | 4/1975 | Havens | 239/566 |
| 3,901,448 | 8/1975 | Babin | 239/145 |
| 3,939,875 | 2/1976 | Osborn et al. | 405/45 |
| 4,474,330 | 10/1984 | Langa | 239/542 |

Primary Examiner—Dennis L. Taylor
Assistant Examiner—J. Russell McBee
Attorney, Agent, or Firm—Lorusso & Loud

[57] ABSTRACT

Pipe for watering plants, having an inner feed pipe (1) provided with orifices (5) and of substantially circular cross-section, on the outside surface of which there are one or a plurality of layers of fibrous material (2a, 2b). The feed pipe (1) and the layers of fibrous material covering at least the orifices (5) therein are enclosed by a casing (3) which is impervious to water and which has a longitudinal slit (4) disposed radially outside over the orifices (5) and through which the water, enriched with fertilizer if necessary, can pass into the soil under control.

3 Claims, 2 Drawing Sheets

PIPE FOR WATERING PLANTS

This is a continuation of co-pending application Ser. No. 015,857 filed on Jan. 13, 1987 abandoned.

The invention relates to a pipe for watering plants, particularly for watering the roots, comprising a feed pipe of substantially circular cross-section and incorporating orifices and on the outside surface of which, at least in the region of the orifices, there is at least one layer of fibrous material. The invention furthermore relates to a method of producing a pipe for the watering of plants.

When watering plant roots, it is important to dispence the water as satisfactorily as possible as it emerges from the pipes laid in the ground for watering purposes in order to prevent the soil becoming waterlogged. At the same time, it is important to prevent the roots growing into the watering pipe and the soil from damaging the pipe or clogging the orifices.

A watering pipe is already known (U.S. Pat. No. 3,302,408) wherein a synthetic plastics pipe provided with orifices is, for regulating the emergence of water, entirely enclosed in a layer of very fine glass fibres over which there is a synthetic plastics net, the entire pipe being wrapped in and held together by a spiral of wire. However, this known pipe has the disadvantage that the external network of synthetic plastics can easily be damaged by stones in the soil or by a working implement. Furthermore, cutting it to specific lengths is very complicated due to the wire which is necessarily wound around it. Also a sealing-tight connection of individual pipes, for example by fitting one into another, is possible only with difficulty.

In addition to this watering pipe of circular cross-section, there are a multiplicity of other watering pipes having complicated cross-section which likewise comprise porous or fibre-like coverings in order to regulate the emergence of water. This disadvantage of such pipes resides above all in the expense of manufacture and in the fact that a tight connection of pipes to one another or a sealing-tight connection to a storage tank, for example, can be very complicated.

Also known is a triple-shell watering pipe comprising an inner elastic and perforated feed pipe, a perforated outer pipe and, in between, a layer of fabric, the orifices in the inner feed pipe and the outer pipe being staggered. In the case of this known pipe, the in most cases easily dirtied water must flow in the direction of the fabric layer in order to pass from an inner bore to an offset outer bore. Thus there is the risk of the pipe becoming clogged with sludge. The known triple sheel pipe also has its disadvantages from the point of view of manufacture. In fact, making the outer orifices presents a difficulty since during the subsequent drilling of these orifices, it is quite likely that the fabric underneath will also be damaged. If the orifices are already drilled into the outer pipe previously, then there is the problem of pushing into the outer pipe the inner casing with its fabric covering.

Therefore, the object of the invention is to provide a rugged and competitively priced pipe of the type mentioned at the outset in which the risk of clogging or siltation is largely reduced and which is easily manufactured. Furthermore, it is intended to regulate the emergence of water which will be directed under control and also to prevent roots growing into the interior of the pipe.

According to the invention, this is achieved in that a water impervious casing pipe is provided which consists preferably of synthetic plastics material and which is provided with at least one longitudinal slit and which substantially entirely encloses the feed pipe and the layer(s) of fibrous material disposed thereon and in that the feed pipe has orifices only in the region of the longitudinal slit in the enclosing casing pipe.

Where the pipe according to the invention is concerned, the water flows through and at a right-angle to the surface of the layer(s) of fibrous material. Slight siltation to which the present pipe is already less susceptible than the pipe in the citation can if necessary be forced out by a brief surge of water (a short period of over-pressure) so that the pipe can be cleaned.

The slit casing pipe furthermore safeguards adequately against mechanical damage from outside the layer of fibrous material which is needed for the measured emergence of water. By reason of the substantially circular cross-section of the pipe and the outer surface of the casing pipe which is closed except for the longitudinal slit, it is possible easily to achieve a sealing-tight connection or attachment of the pipes.

A further advantage of the pipe according to the invention lies in the fact that the longitudinal slit which extends in the longitudinal direction of the pipe allows of orientation of the pipe in connecting or attachment fittings. Also with regard to the cutting of pipes to length, this natural orientation of the cut lengths of pipe which establishes the direction of water emergence is retained. It has in fact been demonstrated that the orientation of the longitudinal slit is of great importance. For example, if the pipe is used for watering perennial plants, having the slit pointing downwardly can lastingly prevent the formation of algae.

So that the casing pipe is disposed concentrically in relation to the inner feed pipe, it is favourable according to a preferred feature of the invention for the feed pipe to be substantially completely encased in one or a plurality of layers of fibrous material. Particularly if thin layers of fibrous material are used, the layer of fibrous material can also be disposed only in the region of the longitudinal slit. In certain circumstances, then, it may be advantageous for the casing and the feed pipe to be welded, cross-linked or glued directly to each other at those places where there is no longer any layer of fibrous material between them.

It is preferably envisaged that the material of the casing pipe and/or of the feed pipe penetrate the layer(s) of fibrous material so that an intimate connection is possible between the layer of fibrous material and the casing pipe or feed pipe and this will inter alia also pervent a layer of fibrous material being forced outwardly through the longitudinal slit in the casing pipe due to the effect of the water pressure in the feed pipe.

According to a further preferred feature of the invention, it is envisaged that at least over a part of its inner surface which is towards the feed pipe, the casing pipe is welded, cross-linked or glued to the feed pipe through the layer(s) of fibrous material so permitting of a secure connection between casing pipe and feed pipe. Furthermore, impregnated with glue or resin and then hardened out or permeated by the material of the welded-together casing and feed pipes, the layer of fibrous material represents a reinforcing layer which imparts quite considerable mechanical strength to the entire watering pipe. Preferably, the casing pipe and the feed pipe consist of thermoplastics synthetic material. A reinforcing layer could then consist, for example, of a glass fibre fleece steeped in a epoxy resin.

A further preferred embodiment of the pipe according to the invention is characterized in that the casing pipe and/or the feed pipe is/are welded to the layer(s) of thermoplastics synthetic material at least over a part of its/their surface which faces towards the layer of fibrous material. Such a pipe can be produced particularly easily and inexpensively and yet it has an intimate connection between the casing and feed pipe on the one hand and the layer of fibrous material on the other.

A further preferred feature of the invention resides in the fact that the layer of fibrous material consists at least partially of a non-rotting material, for example synthetic plastic. Particularly suitable are fine-mesh woven gauzes. Such a layer of fibrous material permits of adequate control of water emergence while permanently preventing penetration of roots. The risk of clogging is minimal.

A further preferred embodiment of the invention resides in that the casing pipe is shrunk onto the feed pipe which is encased by the layer(s) of fibrous material. In this case, the casing pipe and the feed pipe may each have axially extending and corresponding engaging means, for example a tongue and groove, establishing a form closure to prevent the two pipes rotating in respect of each other.

A further object of the invention is to provide a method of easily producing a pipe for watering and comprising a perforated feed pipe, a slotted casing pipe and at least one intermediate layer of fibrous material.

According to the invention, this method is characterized in that the feed pipe, which has a substantially circular cross-section, is extruded in a first extruded and then, in a subsequent station, is prrovided with orifices and in that when the layer(s) of fibrous material, for example woven strips, is/are applied to the longitudinally moving feed pipe, whereupon, in a second extruder, the feed pipe and the fibre layer are enclosed by the casing pipe. Thus it is possible easily and inexpensively to produce an endless watering pipe which can then be cut to any desired length. It is advantageous thereby if the longitudinal slit in the casing pipe is already left exposed in the second extruder.

The invention will be explained in greater detail hereinafter with reference to examples of embodiment shown in the accompanying drawings.

Figure 2:
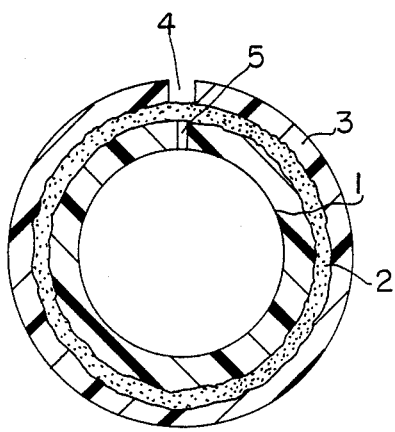
Figure 3:
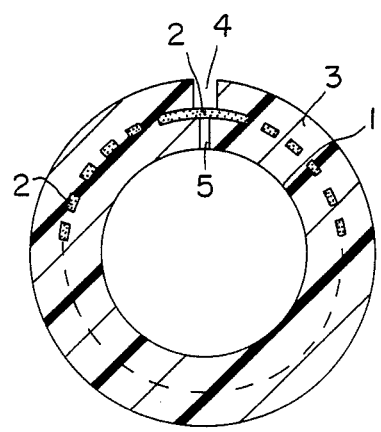
Figure 4:
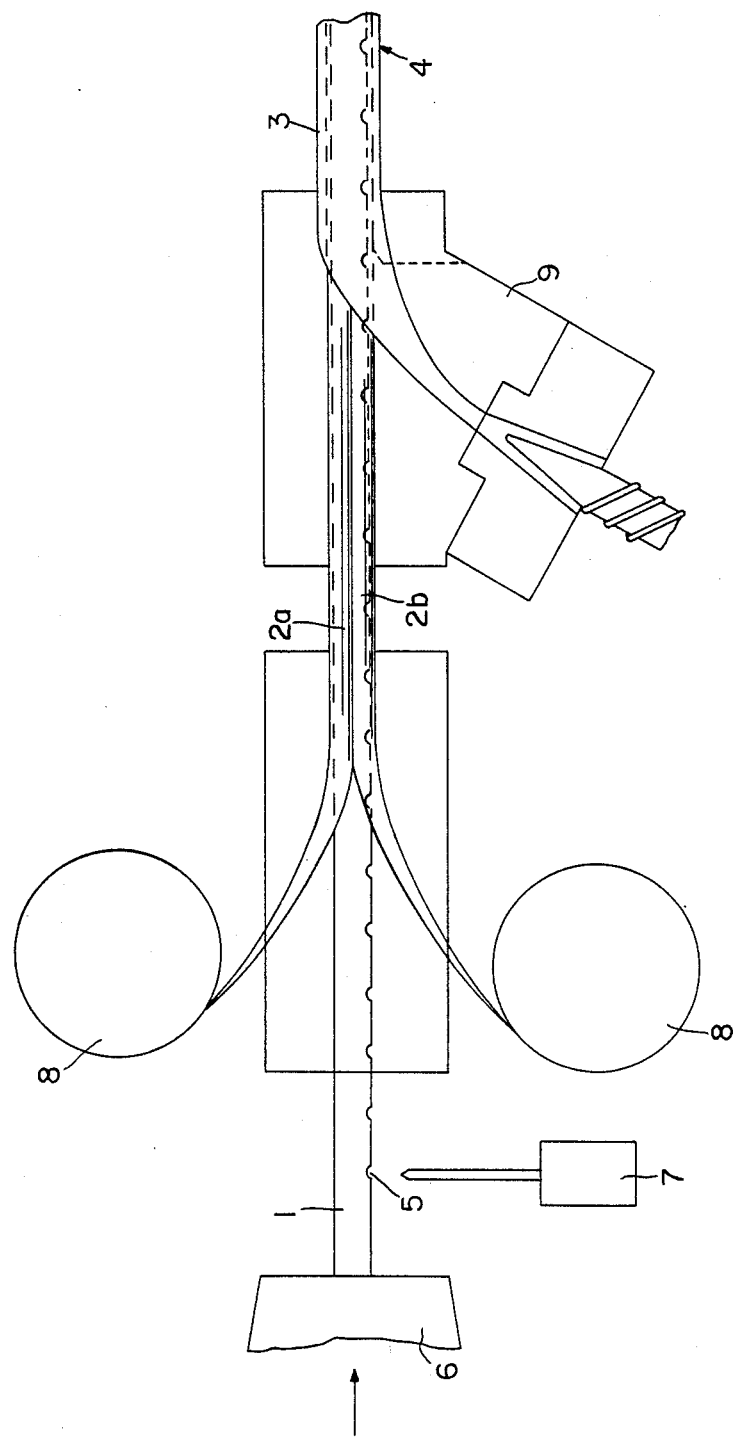

FIG. 1 shows a diagrammatic perspective view of an embodiment of pipe according to the invention;

FIGS. 2 and 3 each show a cross-section through further embodiments of the pipe, and FIG. 4 is a diagrammatic view of an apparatus for carrying out an example of the method according to the invention whereby a watering pipe can be produced.

The pipe shown in FIG. 1 consists essentially of a feed pipe 1 of thermoplastic synthetic material and provided with bores 5 and on the outer surface of which there are two layers 2a, 2b of fibrous material consisting of a non-rotting woven synthetic plastic material, and a casing pipe 3 of thermoplastic synthetic material provided with a longitudinal slit 4 and which is extruded, for example, onto the feed pipe 1 together with the layers 2a, 2b of fibrous material located thereon. With the exception of the longitudinal slit 4, the casing pipe 3 lies rigidly all over on the layers 2a, 2b of fibrous material producing an extremely rugged watering pipe which is unaffected by mechanical stresses from outside caused possibly by relatively large stones or garden implements.

Emergence of water supplied through the feed pipe 1 and discharge through the longitudinal slit 4 in the casing pipe 3 and the bores 5 underneath it and provided in the feed pipe 1 and which, according to the invention, are disposed only in the region of the longitudinal slit 4, is measured out by the layer 2b of fibrous material through which the water passes substantially at a right-angle and which at the same time prevents roots from growing into the interior of the feed pipe 1. The layer 2a of fibrous material shown underneath in FIG. 1 maintains the feed pipe 1 concentrically in the casing pipe 3.

In the case of the embodiment of pipe shown in FIG. 2, the fibre material layer 2 consists of a glass fibre fleece into which the material of the thermoplastic casing pipe 3 and of the feed pipe 1 has penetrated. Only in the region of the longitudinal slit 4 or the bores 5 has no material penetrated the glass fibre fleece. Thus, the protective casing pipe 3 and the feed pipe 1 are on the one hand intimately connected to each other via the fibre material layer 2 while on the other, the same fibre material layer 2 acts in the region of the longitudinal slit 4 as a dispensing deevice to control the emergence of water and as a safeguard to prevent roots penetrating the pipe.

If both the casing pipe 3 andd also the feed pipe 1 consist of thermoplastic synthetic material, then it is possible for both pipes 1, 3 to be welded together. This welding process can take place through the fibre material layer 2, as is the case in the upper part of the pipe shown in FIG. 3, or directly between the two pipes 1, 3 if there is no intermediate layer of fibre material 2 (bottom part of the pipe shown in FIG. 3). If the fibre material layer is of a thermoplastic material, then this can even be welded at the same time. In any event, however, the fibre material layer 2 is retained in the region of the longitudinal slit 4 in the casing pipe 3.

According to the materials used, then in addition to welding of casing pipe and feed pipe, it is also possible for these to be cross-linked or glued to each other. Almost always, a layer of fibrous material which is impregnated, for instance, with glue or resin (cross-linking medium) and which is then allowed to harden out, forms a reinforced layer which enhances the mechanical strength of the pipe.

It goes without saying that the invention is not confined to the above embodiments of pipes. For example, it is also possible for the casing pipe to be shrunk onto the feed pipe and the layer(s) of fibrous material. Furthermore, it is possible also to provide a plurality of layers of fibrous material one on top of another. Furthermore, the orifices in the feed pipe and the longitudinal slits in the casing pipe can within the framework of the invention be differently constructed than is shown on FIGS. 1 to 3.

FIG. 4 diagrammatically shows in arrangement for carrying out a method according to the invention for producing a watering pipe. In a first extruder 6, the feed pipe 1 which has a circular cross-section is extruded and then provided with orifices in a subsequent station 7. Then, strips of woven fabric rolled onto rollers 8 are applied to the perforated feed pipe 1 to serve as layers 2a, 2b of fibrous material. In this respect, according to the material used, it is possible to weld, cross-link or glue these layers 2a, 2b of fibrous material to the feed pipe 1. It is however also possible firstly just to apply the fabric strips 2a, 2b to the feed pipe and to establish a rigid connection between the casing pipe 3, the fibre material layers 2a, 2b and the feed pipe 1 only by means of the casing pipe 3 which is extruded on top. In any event, the casing pipe 1 in the case of the present method is extruded in a second extruder 9, the longitudinal slit 4 over the orifices 5 in the feed pipe 1 being left exposed.

It is possible to use this method to produce endless watering pipes. Then, pipes can be cut to virtually any desired length. When they are laid, these lengths of pipes can be easily and tightly fitted together by means of T-pieces or fit-in sleeves and can thus be easily adapted to the sizes of the area to be watered.

We claim:

1. A method for watering plants, particularly for watering the roots of plants which are buried in the soil, comprising:

providing at least one section of a water feed pipe of substantially circular cross section with inner and outer surfaces and a longitudinal axis, said water feed pipe defining a region of a series of orifices enabling water to be forced through the feed pipe, said orifices being located on a parallel line to the longitudinal axis of the feed pipe;

covering the orifices with a layer of water permeable fibrous material on the outer surface of the feed pipe;

positioning the feed pipe with the fibrous material covering the orifices coaxially within a water impervious casing pipe which defines at least one longitudinal slit, said casing pipe completely enclosing, except for the longitudinal slit, the feed pipe;

orienting the casing pipe in such a way that said longitudinal slit, along the entire feed pipe, is located directly in line with the series of orifices of the water feed pipe;

burying the casing pipe in the soil in relatively close proximity of the roots of the plants to be watered which the longitudinal slit of the casing pipe remains aligned with the series of orifices of the water feed pipe; and forcing pressurized water through said feed pipe so that the water flows along the entire feed pipe and out through said orifices to permeate said layer of fibrous material and flow through said longitudinal slit to provide a water supply to the surrounding soil and the roots of the plants to be watered;

said alignment of the orifices of the water feed pipe with the longitudinal slit of the casing pipe providing easy orientation when connecting separate sections of pipe and reducing the risk of siltation by allowing for an easily regulated, straight line flow of water from the water feed pipe to the surrounding soil while allowing the layer of fibrous material to prevent roots and/or soil from entering the feed pipe.

2. The method of claim 1 including the additional step of;

increasing the pressure of the water over a short period of time to dislodge any foreign particles inhibiting flow thorugh the fibrous material or the longitudinal slit.

3. The method of claim 1 wherein the casing pipe is buried in the soil so that the longitudinal slit of the casing pipe and consequently the orifices of the water feed pipe face downwardly so that when pressurized water is not being forced through the water feed pipe any residual water is driven by the force of gravity to flow through the orifices out of the water feed pipe thereby avoiding the build up of algae in the water feed pipe.

* * * * *